United States Patent
Daye et al.

(10) Patent No.: US 9,648,472 B1
(45) Date of Patent: May 9, 2017

(54) VOICEMAIL TRANSMISSION UTILIZING SIGNALS ASSOCIATED WITH RADIO BAND FREQUENCIES

(71) Applicant: INTERNATIONAL BUSINESS MACHINES CORPORATION, Armonk, NY (US)

(72) Inventors: Sheri G. Daye, Boca Raton, FL (US); William R. Glendenning, Jr., Austin, TX (US); Peeyush Jaiswal, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/071,572

(22) Filed: Mar. 16, 2016

(51) Int. Cl.
*H04M 1/725* (2006.01)
*H04W 4/12* (2009.01)
*H04W 16/14* (2009.01)

(52) U.S. Cl.
CPC .......... *H04W 4/12* (2013.01); *H04W 16/14* (2013.01); *H04M 1/7255* (2013.01)

(58) Field of Classification Search
CPC H04W 8/245; H04M 1/72519; H04M 1/7255
USPC .............. 455/412.2, 418, 550.1; 379/88.11
See application file for complete search history.

(56) References Cited

U.S. PATENT DOCUMENTS

| | | | |
|---|---|---|---|
| 5,894,450 A | 4/1999 | Schmidt et al. | |
| 6,125,080 A | 9/2000 | Sonnenschein et al. | |
| 8,238,526 B1 * | 8/2012 | Seth | H04M 1/7255 379/88.11 |
| 2009/0154667 A1 * | 6/2009 | Hao | H04M 3/53325 379/88.18 |
| 2009/0213697 A1 | 8/2009 | Irie | |
| 2010/0035562 A1 * | 2/2010 | Alberth, Jr. | H04B 15/02 455/75 |
| 2010/0279725 A1 * | 11/2010 | Muraoka | H04W 72/02 455/509 |
| 2011/0051910 A1 * | 3/2011 | Gray | H04L 12/5815 379/88.22 |
| 2012/0172008 A1 * | 7/2012 | Gupta | H04L 51/20 455/413 |
| 2013/0122870 A1 * | 5/2013 | Hegde | H04M 1/6505 455/412.2 |
| 2014/0348367 A1 | 11/2014 | Vavrus et al. | |

FOREIGN PATENT DOCUMENTS

| | | |
|---|---|---|
| CN | 2380267 Y | 5/2000 |
| CN | 101388731 A | 3/2009 |

OTHER PUBLICATIONS

Mohd Ansor Bin Yusof et al., "Underwater Communication Systems: A Review", Mar. 20-23, 2011, pp. 803-807.

* cited by examiner

*Primary Examiner* — Danh Le
(74) *Attorney, Agent, or Firm* — Cantor Colburn LLP; David Zwick

(57) ABSTRACT

A method for transferring information indicative of a voicemail to a recipient includes receiving a message via a voicemail system transmitted from a remote device. The method also includes storing the message in a memory associated with the voicemail system. The method further includes transmitting a voicemail notification indicator to a recipient via a designated radio frequency band for receipt by a recipient having access to a radio receiver.

19 Claims, 3 Drawing Sheets

VOICEMAIL TRANSMISSION UTILIZING SIGNALS ASSOCIATED WITH RADIO BAND FREQUENCIES

BACKGROUND

The present invention generally relates to the transmission of a voicemail message, and more particularly to the transmission of voicemail messages utilizing radio waves associated with radio band frequencies associated with AM and FM.

SUMMARY

In accordance with an embodiment, a method for transferring information indicative of a voicemail to a recipient is provided. The method includes receiving a message via a voicemail system transmitted from a remote device. The method also includes storing the message in a memory associated with the voicemail system. The method further includes transmitting a voicemail notification indicator to a recipient via a designated radio frequency band for receipt by the recipient having access to a radio receiver.

In another embodiment of the invention, a system for transferring information indicative of a voicemail to a recipient is provided. The system includes a voicemail system including a processor and memory for receiving a voicemail message. The system also includes a configurable status parameter stored in the memory having either a first or second value. A signal generator is included for generating a voicemail notification indicator identifying the existence of a voicemail message received by a predetermined voicemail mailbox for transmission to a recipient. The voicemail notification indicator being generated if the configurable status parameter has a value which identifies that the signal should be sent to a recipient. The system further includes a transmitter for transmitting a radio signal utilizing a designated radio frequency band. The transmitter transmitting the voicemail notification indicator utilizing a designated radio frequency band to a recipient. The designated radio frequency band includes those bands in the amplitude modulated radio frequency spectrum and those bands in the frequency modulated radio frequency spectrum.

In accordance with a further embodiment, a computer program product for transferring information indicative of a voicemail to a recipient includes a non-transitory storage medium readable by a processing circuit and storing instructions for execution by the processing circuit for performing a method. The method includes receiving a message via a voicemail system transmitted from a remote device. The method also includes storing the message in a memory associated with the voicemail system. The method further includes transmitting a voicemail notification indicator to a recipient via a designated radio frequency band for receipt by the recipient having access to a radio receiver.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In today's communication environment, voicemail messages are commonly left in place when a recipient of a verbal communication is not available. For instance, when a party utilizes telephonic instruments such as a cell phone to place a call to a recipient, a voice mail exchange may be utilized in the situation the recipient does not answer the call. In this situation, the caller is directed to the voice mail exchange to leave a verbal or non-verbal message to the recipient in the recipient's designated voicemail box. If a message is left, the voice mail exchange sends a notification to the recipient generally utilizing the telephonic network notifying the recipient that a voicemail message exists at their designated mail box at the voice mail exchange. The individual then has the option of interfacing with the voicemail exchange and in particular with their designated mail box to retrieve the message at a time convenient for them.

Advancements in voicemail systems are desired that enable end users to have access to their respective voicemail messages when telephonic or computer networks accessing the voicemail exchange are unavailable.

Embodiments of the present disclosure present a novel voicemail delivery system utilizing radio waves associated with AM and FM frequencies. In exemplary embodiments, standard communication systems can be utilized to transmit a message to a message receipt system. In operation, the standard communication system is a networked system such as a telephonic system utilizing either cellular or land line transmission methods or an internet system utilizing interfaces suitable for verbal communication, such as Skype®. While these systems are adapted for verbal communication, such systems can also be utilized to transmit non-verbal communications such as phone numbers and the like utilizing an input device such as a keyboard or phone number pad.

Figure 1:
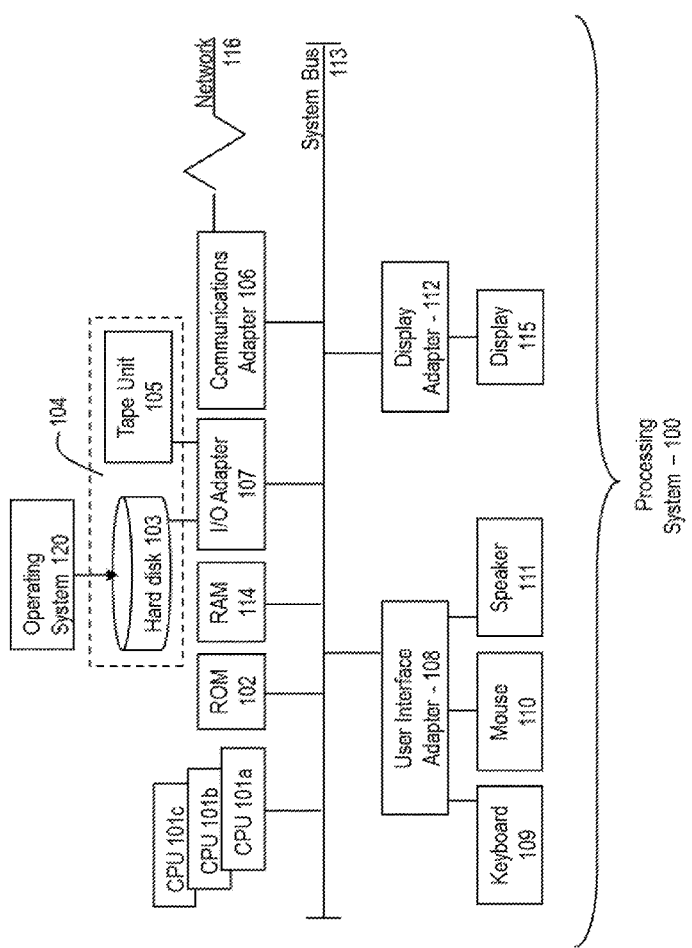
FIG. 1 is a block diagram illustrating one example of a processing system for practice of the teachings herein.

Referring to FIG. 1, there is shown an embodiment of a voicemail processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the voicemail processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

In exemplary embodiments, a voicemail processing system is provided that utilizes a voicemail storage and retrieval process which stores the message in a dedicated message storage location. In one embodiment, this dedicated message storage location is associated with a single voicemail subscriber. The single voicemail subscriber has access to the dedicated message storage location utilizing prescribed access means. Depending on the preferences of the subscriber, the voicemail processing system may provide a voicemail notification indicator to the recipient. In exemplary embodiments, the voicemail notification indicator is transmitted to the recipient utilizing radio waves associated with radio frequencies associated with Amplitude (AM) or Frequency (FM) modulation for being received by a radio.

In operation, the voicemail system can be integrated with a communication network, such as a telephonic network which utilizes either a landline or a cellular network for communicating a message from a remote device to the voicemail system. In an alternative system, the communication network includes a computer based network which is capable of transmitting a message to the voicemail system. In these systems, the voicemail message is any message which is digitally processed by the processor and may include a digitally processed verbal message or a digitally processed inputted message such as message inputted utilized a keyboard or touchpad.

Figure 2:
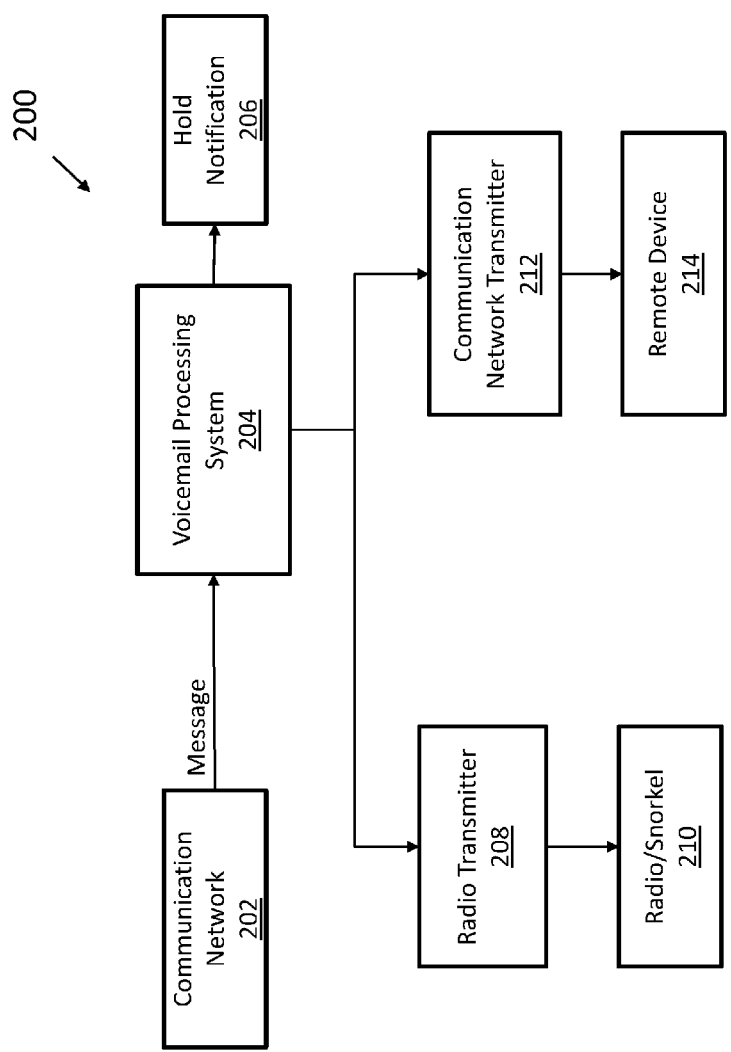
FIG. 2 is a block diagram illustrating a system for transferring information indicative of a voicemail to a recipient in accordance with exemplary embodiments.

Referring now to FIG. 2, a system 200 for transferring information indicative of a voicemail to a recipient in accordance with an embodiment is shown. As illustrated, the system 200 includes a voicemail processing system 204 that receives a message from a communication network 202. The voicemail processing system 204 has multiple options for processing the voicemail for delivery to a recipient. As shown at block 206, a recipient may have designated that no notification should be delivered in a "do not disturb" or "hold" mode. Additionally, the system 200 includes a communication network transmitter 212 that is configured to transmit a voicemail notification indicator indicating that a voicemail has been received to a subscriber's mailbox on a remote device 214 associated with the user. In one embodiment, the voicemail notification indicator may be transmitted either through a communication network which includes customary digital telephony or computer networks for transmitting the message notification to a digital remote device. The system 200 also includes a radio transmitter 208 that is configured to transmit a voicemail notification indicator over a designated radio band for being received by a radio device 210 associated with the user. In certain embodiments, the transmitters may be the same.

Figure 3:
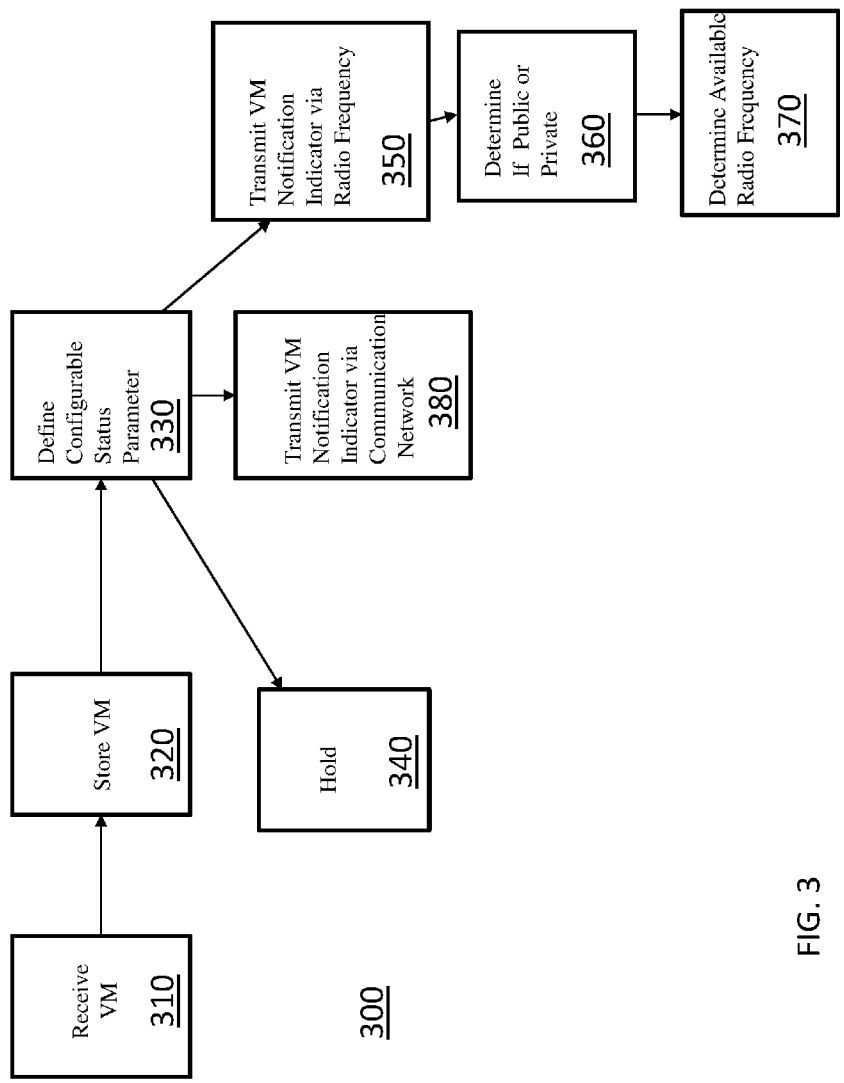
FIG. 3 shows a flow chart illustrating a method for a voicemail transmission system utilizing signals associated with radio band frequencies in accordance with an embodiment.

Referring now to FIG. 3 a method 300 for practicing the invention is disclosed (in FIG. 3, "VM" is an abbreviation for "voicemail"). In operation, the voicemail message is received by the voicemail processing system at block 310 for processing and is stored in a memory at a dedicated subscriber mailbox for subsequent retrieval by the subscriber at block 320. In the voicemail processing system, the subscriber is provided selectable options for defining the configurable status parameter at block 330 for controlling the notification and delivery of the voicemail message to the subscriber. In one embodiment, a voicemail notification indicator is utilized for determining if the subscriber is to be notified that a voicemail message has been received and stored in the subscriber's mailbox. This notification parameter includes a first status corresponding to a send function and a second status corresponding to a hold function at block 340. If the notification parameter is set to the first status corresponding to "send," the voicemail notification indicator may be directly transmitted to the recipient utilizing radio waves located within a designated radio frequency band corresponding to AM or FM frequencies at block 350. If the message notification is to be transmitted via the corresponding AM or FM frequency, the end user has the option of subscribing to a public frequency used by a plurality of subscribers or a private frequency dedicated to a single user. At block 360, it is determined if the subscriber is utilizing a private or public frequency. The available commercial frequencies are determined at block 370 for transmitting the notification parameter. Additionally, the notification parameter may include a third status to indicate that the voicemail notification indicator is to be transmitted to the recipient utilizing standard a communication network such as a landline or cellular network at block 380. In this environment, an end user may control the delivery of the voice mail via the notification parameter.

In this environment, the end user may hold all notifications in a "do not disturb" type of environment. Additionally, the end user may receive notifications under normal conditions by designating that the configurable status parameter is set to "send" and the voicemail notification indicator is "send" and the delivery system identified as the normal cellular or landline telephony system such that the message is received by the recipients remote device. Furthermore, in the situation where the end user may be in an environment where access to the remote device is not denied, the end user may utilize a radio receiver for receiving a notification of a voice mail message by identifying that the voicemail message should be sent but delivered via a transmitter utilizing a designated radio frequency band corresponding to AM or FM frequencies.

In exemplary embodiments, the voicemail system includes a transmitter tuned to transmit the voicemail notification indicator utilizing a designated radio frequency band associated with the AM or FM band.

In exemplary embodiments, the processor evaluates the particular instructions indicating if the voicemail notification indicator message is to be sent and if so, via the preferred method. If the preferred method has been selected as being via the transmitter, the processor sends the voicemail notification indicator to the transmitter for transmission over the designated radio frequency band for receipt by a subscriber.

In exemplary embodiments, the voicemail notification indicator identifies a particular subscriber mailbox. In operation, the voicemail notification indicator may include a message such as "mailbox 123 has a message", or a more particular message which includes ancillary information which identifies the message composer such as "mailbox 123 has a message from John Doe or 123-456-7890".

In the preferred embodiment, the respectively designated radio frequency is obtained by identifying the radio frequencies located with the amplitude modulated frequency range or frequency modulated frequency range which is not assigned to a predetermined commercial radio facility within a predetermined area thereby identifying unused radio wave frequencies for transmission of the voicemail notification indicator. In this manner, radio interference will not be incurred.

In an additional embodiment, certain unused frequencies may be subscribed by a singular subscriber thereby providing a direct one to one corresponding frequency for that particular subscriber thereby eliminating voicemail notifications which do not necessarily correspond to that particular individual and thereby making that particular frequency a "private line" versus a "party line".

In an exemplary embodiment, the entire voice message could be sent to the subscriber. In this embodiment, the message provider may be alerted that they may provide a message which preferably does not contain confidential or private information and the message may be provided "publically" over a respectively designated radio frequency. In this embodiment, a fourth status is provided which corresponds to "send entire voicemail message". If this status is selected, then the voicemail notification indicator will include the actual message. In this embodiment, the voicemail is digitally processed by the processor for transmission by the transmitter.

In an exemplary embodiment where the subscriber lacks access to a remote device such as a phone or computer, the person maybe swimming. In this environment, the person may utilize a snorkel. In a particular embodiment, the snorkel may be equipped with a radio receiver. In this environment, the snorkel may be tuned to a particular designated radio frequency which corresponds to the subscriber's designated radio frequency for receiving a voicemail indicator notification signal.

In exemplary embodiments, the respectively designated radio frequency is obtained by identifying the radio frequencies located within the amplitude modulated frequency range or frequency modulated frequency range which is not assigned to a predetermined commercial radio facility within a predetermined area thereby identifying unused radio wave frequencies for transmission of the voicemail notification indicator. In this manner, radio interference will not be incurred.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for transferring information indicative of a voicemail to a recipient, the method comprising:
   receiving a message via a voicemail system transmitted from a remote device;
   storing said message in a memory associated with said voicemail system, wherein said message comprises a configurable status parameter having a first status corresponding to a send function and a second status corresponding to a hold function, wherein when said status corresponds to said send function; and
   transmitting a voicemail notification indicator to a recipient via a designated radio frequency band for receipt by the recipient having access to a radio receiver, wherein said voicemail notification indicator is transmitted to the recipient via radio waves via said designated radio frequency band which may either be within an amplitude modulated frequency or frequency modulated frequency.

2. The method of claim 1, wherein the voicemail system is integrated with a telephonic network utilizing at least one of a landline and cellular network for communicating a message from said remote device to said voicemail system.

3. The method of claim 1, wherein the voicemail system is integrated with a computer based network for communicating a message from said remote device to said voicemail system.

4. The method of claim 1, further including identifying radio frequencies located within an amplitude modulated frequency range or frequency modulated frequency range which are not assigned to a predetermined commercial radio facility thereby identifying unused radio wave frequencies as said designated radio frequency band for transmission of said voicemail notification indicator.

5. The method of claim 1, further including said configurable status parameter having a third status corresponding on sending the voicemail notification indicator via a communication network including telephonic equipment.

6. The method of claim 1, wherein said voicemail notification indicator is a message identifying a voicemail box associated with receipt of the voicemail message.

7. The method of claim 6, wherein a plurality of voicemail notification indicators corresponding to distinct voicemail boxes are transmitted over the same designated radio frequency band.

8. The method of claim 1, wherein said voicemail message is transmitted to said recipient over said designated radio frequency band.

9. The method of claim 1, wherein said voicemail notification indicator is transmitted to said recipient over a designated radio frequency band designated solely for that respective recipient.

10. A system for transferring information indicative of a voicemail to a recipient, the system comprising:
    a voicemail system including a processing unit and a memory for receiving a voicemail message;
    a configurable status parameter stored in said memory having either a first value or a second value;
    a signal generator generating a signal indicative of an existence of a voicemail message received by a predetermined voicemail mailbox for transmission to a recipient, said signal indicative of the existence of a voicemail message being generated if said configurable status parameter has a value which identifies that the signal should be sent to a recipient; and
    a transmitter for transmitting a radio signal utilizing a designated radio frequency band, said transmitter transmitting said signal indicative of the existence of a voice mail message utilizing said radio signal utilizing a designated radio frequency band to a recipient, and
    wherein said designated radio frequency band includes those bands in an amplitude modulated radio frequency spectrum and those bands in an frequency modulated radio frequency spectrum.

11. The system of claim 10, wherein said processing unit presents said voicemail message for transmission to said transmitter and said transmitter transmits said voicemail message utilizing said designated radio frequency band.

12. The system of claim 10, further including a radio receiver for receiving said signal indicative of the existence of a voicemail message transmitted via said designated radio frequency band.

13. The system of claim 12, wherein said radio receiver is embedded in a swimming snorkel.

14. The system of claim 12, wherein said voicemail system is integrated with a telephonic network utilizing either a landline or cellular network for communicating a message from a remote device to said voicemail system.

15. The system of claim 12, wherein said voicemail system is integrated with a computer network for communicating a message from a remote device to said voicemail system.

16. The system of claim 10, wherein said system includes a voicemail subscription parameter wherein a subscriber of the voicemail system may subscribe to delivery of said voicemails directly upon receipt by said system to said subscriber, wherein said voicemail subscription parameter identifies a distinct voicemail box.

17. The system of claim 10, wherein a plurality of voicemail messages intended for distinct recipients are stored in different accessible locations having distinct identifiers for subsequent retrieval from the distinct recipients, said distinct identifiers capable of being transmitted via said transmitter over the same designated radio frequency band to said distinct recipients notifying them that a voicemail message associated with their designated accessible location is retrievable.

18. A computer program product for transferring information indicative of a voicemail to a recipient including a non-transitory storage medium readable by a processing circuit and storing instructions for execution by the processing circuit for performing a method, said method comprising:

receiving a message via a voicemail system transmitted from a remote device; storing the message in a memory associated with the voicemail system; and transmitting a voicemail notification indicator to a recipient via a designated radio frequency band for receipt by the recipient having access to a radio receiver;

a configurable status parameter having a first status corresponding to a send function and a second status corresponding to a hold function, wherein when said status corresponds to said send function said voicemail notification indicator is transmitted to a recipient via radio waves via a amplitude modulated frequency or frequency modulated frequency.

19. The computer program product of claim 18, further including said configurable status parameter having a third status corresponding on sending the voicemail notification indicator via a communication network including telephonic equipment.

* * * * *